United States Patent [19]

Piacenti et al.

[11] Patent Number: 5,046,905
[45] Date of Patent: Sep. 10, 1991

[54] WINGED DRILL SCREW

[75] Inventors: Frank Piacenti, Campbellsville; Steven N. Flinchum, Elkhorn, both of Ky.

[73] Assignee: Emhart Inc., Towson, Md.

[21] Appl. No.: 376,325

[22] Filed: Jul. 6, 1989

[51] Int. Cl.⁵ .................................... F16B 25/00
[52] U.S. Cl. .................................... 411/387; 408/224
[58] Field of Search ............... 411/386, 387, 418, 420, 411/421; 408/224

[56] References Cited

U.S. PATENT DOCUMENTS

| | | | |
|---|---|---|---|
| 3,395,603 | 8/1968 | Skierski | 411/387 |
| 3,916,757 | 11/1975 | Wilson | 408/224 |
| 4,028,987 | 6/1977 | Wilson | 408/224 |
| 4,347,027 | 8/1982 | Brindle | 408/224 |
| 4,480,951 | 11/1984 | Regensburger | 411/387 |
| 4,645,396 | 2/1987 | McCauley et al. | 411/387 |

Primary Examiner—Neill R. Wilson
Attorney, Agent, or Firm—Spencer T. Smith

[57] ABSTRACT

A self-drilling and thread forming fastener for fasting a first softer workpiece, such as wood, to a second harder workpiece, such as metal, is described. The fastener features wings of improved configuration including positive angle of attrack, positive cutting edge relief angles, teardrop-like crescent shape across section and knife-like cutting edge which exhibit faster drill times through wood.

7 Claims, 13 Drawing Sheets

WINGED DRILL SCREW

BACKGROUND OF THE INVENTION

1. Field of the Invention

The invention relates to self-drilling screws for fastening a softer material such as wood to a harder material such as metal. Such screws are of the type having projections, or wings, thereon to bore through the first softer material and prevent binding of the threads. In particular, the invention provides a self-drilling screw having wings of a novel configuration, which screw has faster drill times through wood than known prior art screws.

2. Description of the Prior Art

Self-drilling screws having points produced in a cold forging or pinch pointing operation are known. For example, U.S. Pat. Nos. 3,395,603; 4,295,768; 4,725,175; and 4,787,792 describe screws produced by such an operation.

Self-drilling screws for drilling and fastening a first softer work member, such as wood, to a second harder work member, such as metal, are also known. Such screws typically feature frangible wings which break off after reaming out the wood portion. For example, U.S. Pat. Nos. 3,699,841; 3,982,464; 4,347,027; 4,645,396; 4,655,661; 4,722,107; U.K. Patent 1,093,709; and DE 2,613,720 describe such self-drilling screws having fractureable wings. Self-drilling screws featuring non-breakable wings are also known. For example, U.S. Pat. No. 3,478,639 and 4,028,987 disclose such screws having non-breakable wings.

U.S. Pat. No. 3,478,639 describes an insulation standoff screw having a dwell area between two threaded sections and protrusions, wing-like in appearance, located in the dwell area and formed in a secondary pinch point operation. The protrusions, or lugs, are basically rectangular in profile and cross-section. The working surface of the protrusion which acts as an abatement, or positive stop, is perpendicular to the axis of the threaded fastener. The protrusions act as a positive stop and do not fracture upon contact with the bottom workpiece, thereby limiting fastener penetration to avoid compression or distortion of the top insulation workpiece. The protrusions do not enhance the ability of the fastener to cut or bore either workpiece.

U.S. Pat. Nos. 3,699,841 and 3,982,464 describe self-drilling points whose typical application is to fasten two unlike materials, such as wood to steel. These points are formed in two separate operations; one to form the basic drill point, and one to form the wings via a separate forging or pinch pointing operation. Point orientation is critical in such a separate operation, and requires additional fixturing, tooling, and set-up time to position and form the wings correctly. The wings described in U.S. Pat. No. 3,699,841 are also positioned with a negative (forward) rake angle to the axis of the fastener's rotation. Such a negative rake angle will tend to inhibit the chips from escaping by acting as a dam or a blockage. In contrast, the present invention provides a drill point and wings completely formed in one forging operation with the wings having an improved configuration so as to enhance cutting action and chip escape.

U.S. Pat. No. 4,028,987 describes a self-drilling fastener having an odd shaped drill point which includes wings. The wings depicted in this patent do not fracture upon contact with the workpiece. Rather, these wings are an integral part of the drill point and must remain intact for the drill point to perform correctly. In order to effectively fasten two unlike materials, such as wood to steel, it is essential that the wings fracture on contact. Therefore, the point and wing design described in this patent does not serve to fasten two unlike materials.

U.S. Pat. Nos. 4,347,027 and U.K. 1,093,709 describe self-drilling points typically used to fasten two unlike materials, such as wood to steel. Once again, those points are formed in two separate operations; one to form the basic drill point, and one to form the wings via forging or pinch pointing. The wings of this patent are described in the primary embodiment as two diametrically opposed semi-circular slots and ears of approximate circular shape and which are formed by circular dies. A second embodiment of these wings has two diametrically opposed ears formed by dies where said ears extending from the shank have rear edges substantially normal to the line of the shank, front edges extending at a shallow angle to the line of the shank and an outer side curved for the major part. This form of ear is designed to countersink a workpiece to accommodate the head of the screw before they break away. A third embodiment is identical to the second embodiment except that a notch is provided in the front edge of each ear. In this way, each ear is divided into a front portion which countersinks and recesses the hole and a second portion of enlarged radial dimensions. Inherent in the design of these points is the necessity of increased screw length. This increases not only raw material cost, but also manufacturing costs, due to tooling required and difficulty of handling and feeding in subsequent operations, such as thread rolling. In contrast, the present invention provides a point which is completely formed in one forging operation and does not require an increase in screw length.

U.S. Pat. No. 4,645,396 describes a self-drilling point whose typical application is to fasten two unlike materials, such as wood to steel. Again, the point is formed in two separate operations, one of which is forging (pinch pointing) to form the wings. The continuous cutting edge of this design establishes the criticality of heat treatment in conjunction with wing thickness. With this design, if the heat treatment is improperly completed, the wing may not fracture immediately or cleanly upon initial contact with the bottom, or metal, workpiece, and the continuous cutting edge of this design will naturally drill into, and possibly through the metal workpiece, causing an unwanted decrease in thread engagement and holding strength. In contrast, the present invention provides a drill point which completely forms the correct hole diameter before the wings engage the bottom, or metal, workpiece, thereby creating a torque differential to easily fracture the wings and maintain proper hole diameter for optimum thread engagement and holding performance.

U.S. Pat. No. 4,655,661 describes a self-drilling point whose typical application is to fasten two unlike materials, such as fiber plate to a metal substructure. This point appears to be formed in one forging (pinch pointing) operation. The dies appear to be somewhat intricate to manufacture. This patent describes its point as a conical drill point designed with an apex angle of approximately 30°, with two cutting edges mounted at a distance from the point of the screw on opposing generating lines, said cutting edges being in the form of small, flat tabs with a curved, preferably approximately semi-circular outer edge. The two cutting edges are located at the same axial height on the drill point and have the same radial dimensions. The disadvantage of this point is that its design is suitable, at best, to drill or pierce relatively thin (0.040 inch) metal sub-structures.

U.S. Pat. No. 4,722,107 describes a wood-to-metal drill screw having vertical wings 30 made in the same forging, or pinch pointing, operation in which the drill point is produced. A pair of dies for shaping the point and the wing are also described. The wings are formed in rectangular cavities. As is known in the art, use of such cavities results in misformed, especially rounded or underfilled, wings. The rounding, or underfilling, results in an undesirable negative relief angle along the cutting edge. In addition, the vertical configuration does not provide a positive angle of attack. In contrast, the present invention provides a drill point and wings wherein the wings have an improved configuration including positive cutting edge relief angle and a positive angle of attack so as to enhance the cutting action and chip escape.

SUMMARY OF THE INVENTION

The invention provides an improved drill screw which includes a drill point and wings simultaneously produced via a cold forging or pinch pointing operation. The wings feature an improved configuration including a positive angle of attack B of from about one to about five degrees, a positive cutting edge relief angle of from about ten to about fifty degrees, a trailing end angle of from about five to about thirty-five degrees, and a teardrop like crescent shaped cross section which allows for a knife-life cutting edge. This improved configuration results in unexpectedly faster drilling through wood.

DESCRIPTION OF THE PREFERRED EMBODIMENT

Figure 1:
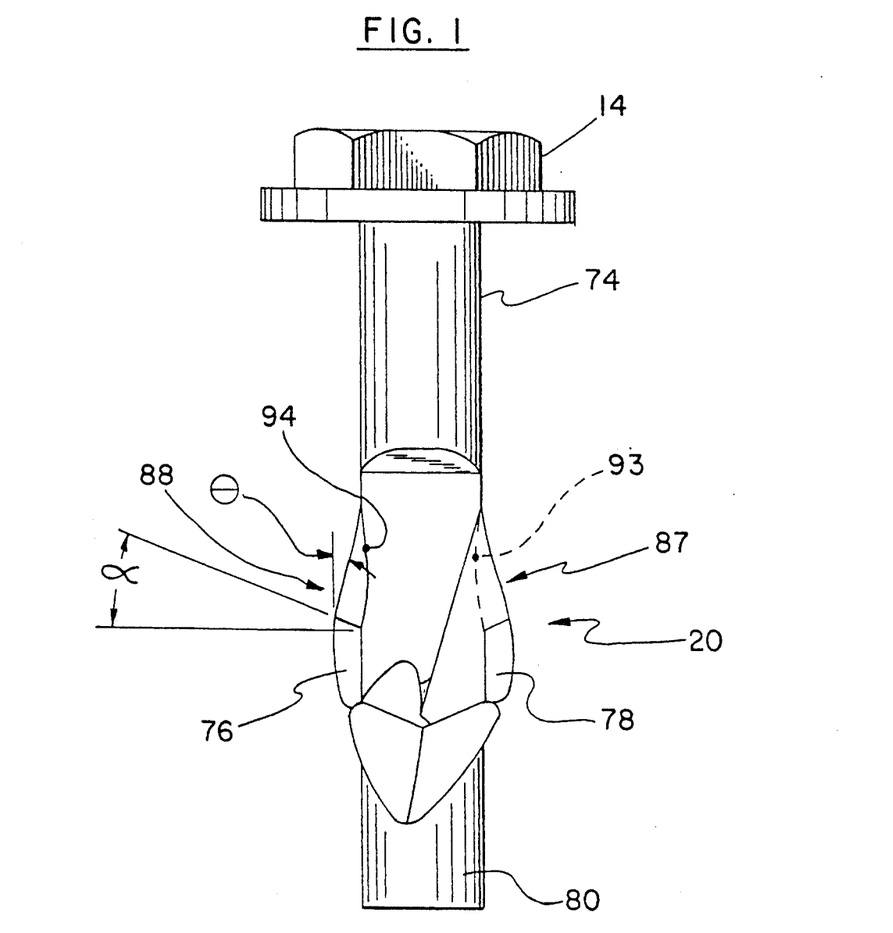
FIG. 1 is a side elevation of a metal screw blank following the forging, or pinch pointing, operation according to the present invention, and prior to the threading operation.
Figure 6:
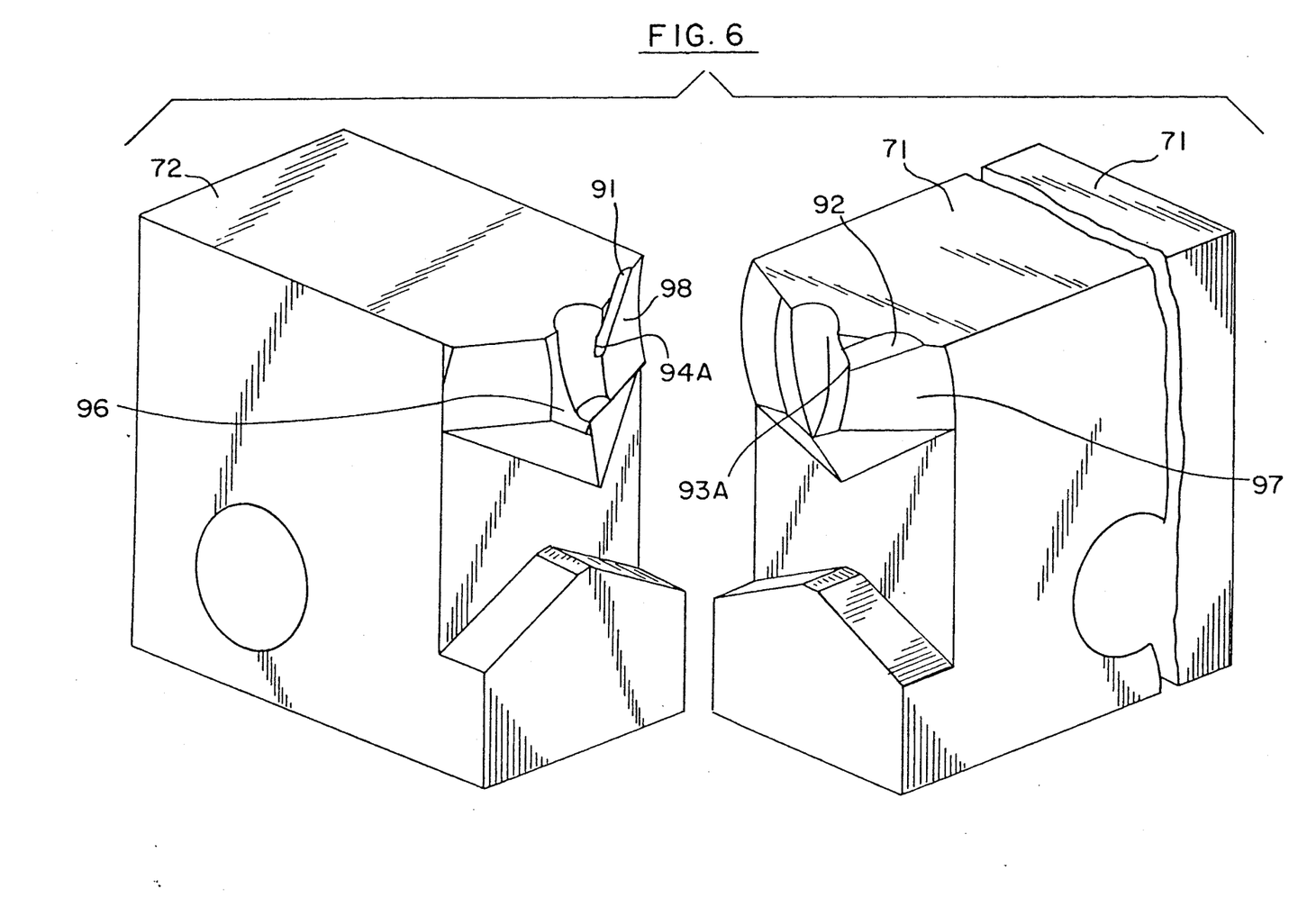
FIG. 6 is a perspective view of a pair of dies particularly adapted to form the screw depicted in FIG. 1 via a forging, or pinch pointing, operation.

A screw blank, comprising an elongated shank 12, and a head 14, is positioned between a pair of dies 71 and 72, and subjected to a cold forging, or pinch pointing, operation. The cold forging, or pinch pointing, operation produces drill point section 20, having a generally elliptical transverse configuration with flutes or slots 22 and 24 and drill point body lands 46, 46A and 48, 48A which will be described in greater detail hereinafter. Wing-like protrusions 87 and 88, located in the flash 76 and 78 and attached to the drill point section 20 along the secondary cutting edges 30 and 38 of flute surfaces 26 and 34 are also produced during the forging or pinch pointing operation. The blank is then subjected to a thread rolling operation which rolls the end 80 and the unwanted sections of flash 76 and 78 off the blank, as well as rolling threads 50 into the shank of the screw. Wing-like protrusions 87 and 88 are unaffected by the rolling operation because rolling dies are modified to provide clearance to allow the wing-like protrusions 87 and 88 to pass through the rolling process unobstructed and undamaged while at the same time making contact with and detaching the end 80 and the unwanted sections of flash 76 and 78. Such clearance can be provided by utilizing spacer blocks or by providing clearance space on the rolling die itself, as is known to the art.

Figure 2:
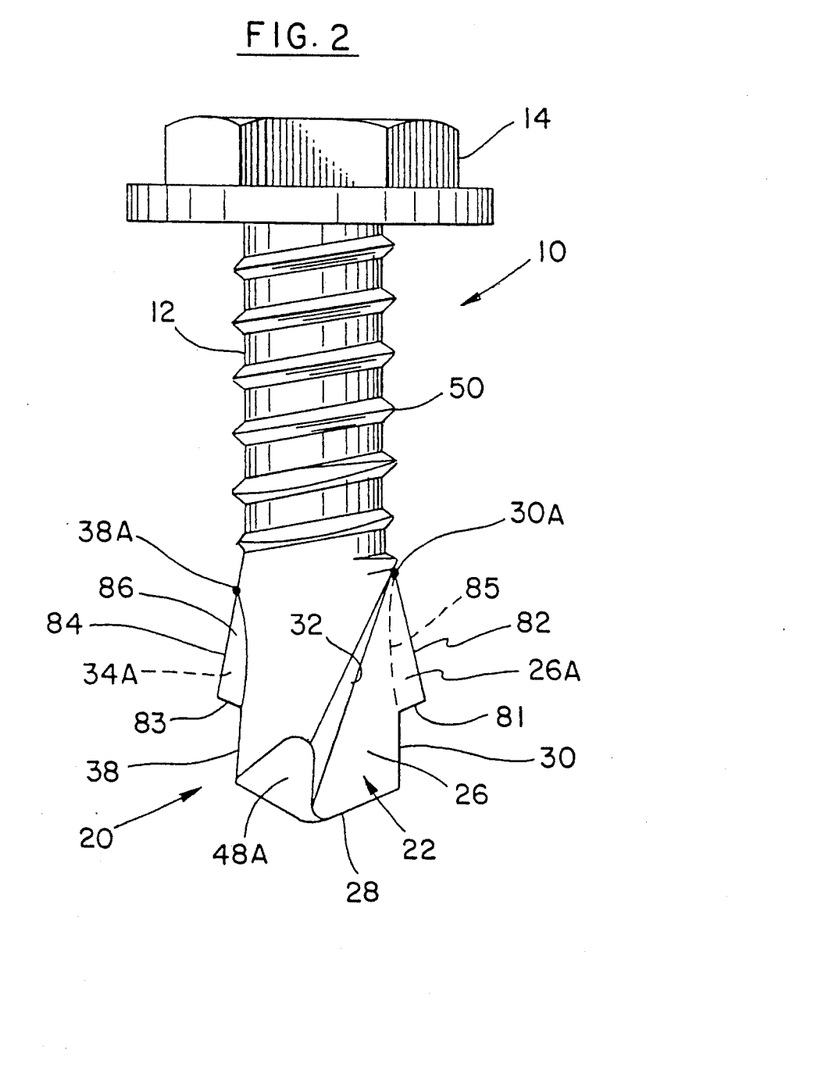
FIG. 2 is a side elevation of a completed metal screw having wings according to the present invention, which is formed by threading the screw blank shown in FIG. 1.

Referring to FIG. 2, the completed screw 10 comprises an elongated shank 12, having threads 50, and with a head section 14 integral with a trailing end thereof. The head section may be provided with any convenient, conventional means cooperative with a tool for turning the screw to effect insertion or withdrawal.

Figure 4:
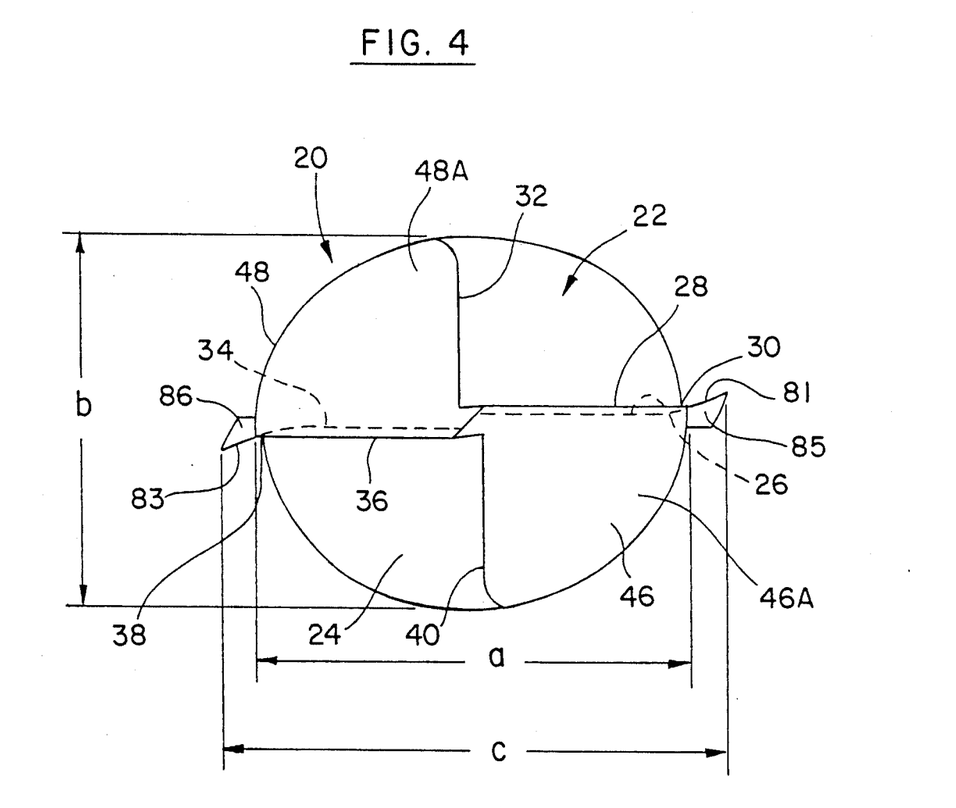
FIG. 4 is an end view of the entering portion, or pilot end, of the screw shown in FIGS. 2 and 3.
Figure 5:
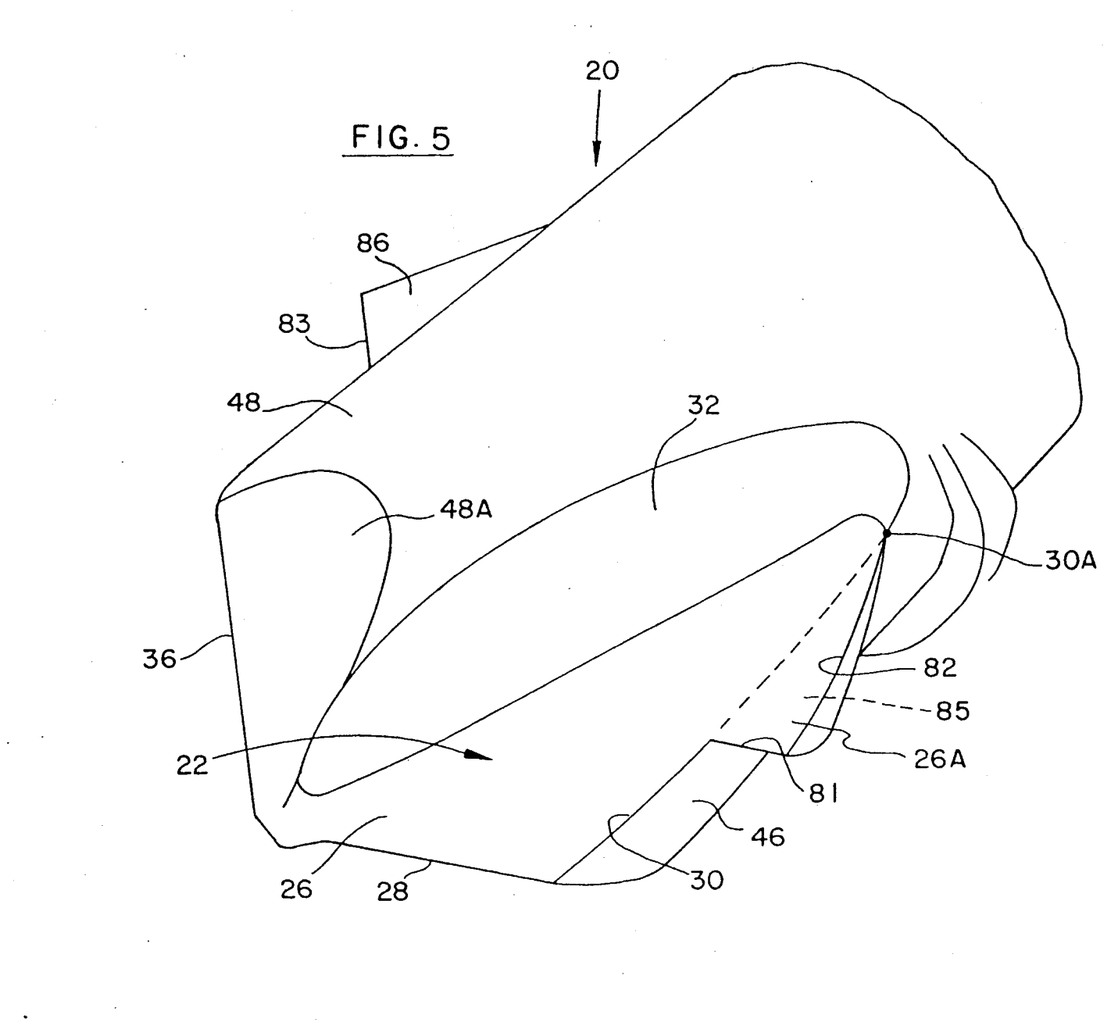
FIG. 5 is a perspective view of the entering portion, or pilot end, of the screw illustrated in FIGS. 2, 3, and 4.

The screw 10 has a pilot end 20, of substantially elliptical transverse configuration, as viewed in FIG. 4. The term elliptical is here used for purposes of description, or visualization only, and it is not intended in a strict mathematical sense. A screw according to the present invention may use any number of drill point or pilot end configurations; for example, those described in U.S. Pat. Nos. 3,395,603; 4,295,768; 4,725,175, or 4,787,792. In general, such pilot end points feature longitudinally extending flutes, or slots, 22, 24 formed in opposite quadrants of the pilot end. The flute 22 is defined by a flute surface 26 having pilot cutting edges 28 (primary) and 30 (secondary), wing cutting edge 81, wing trailing edge 82, and by a drag surface (flute wall) 32. The flute 24 is defined by a flute surface 34, having pilot cutting edges 36 (primary) and 38 (secondary), wing cutting edge 83, wing trailing edge 84, and by a drag surface (flute wall) 40.

Figure 3:
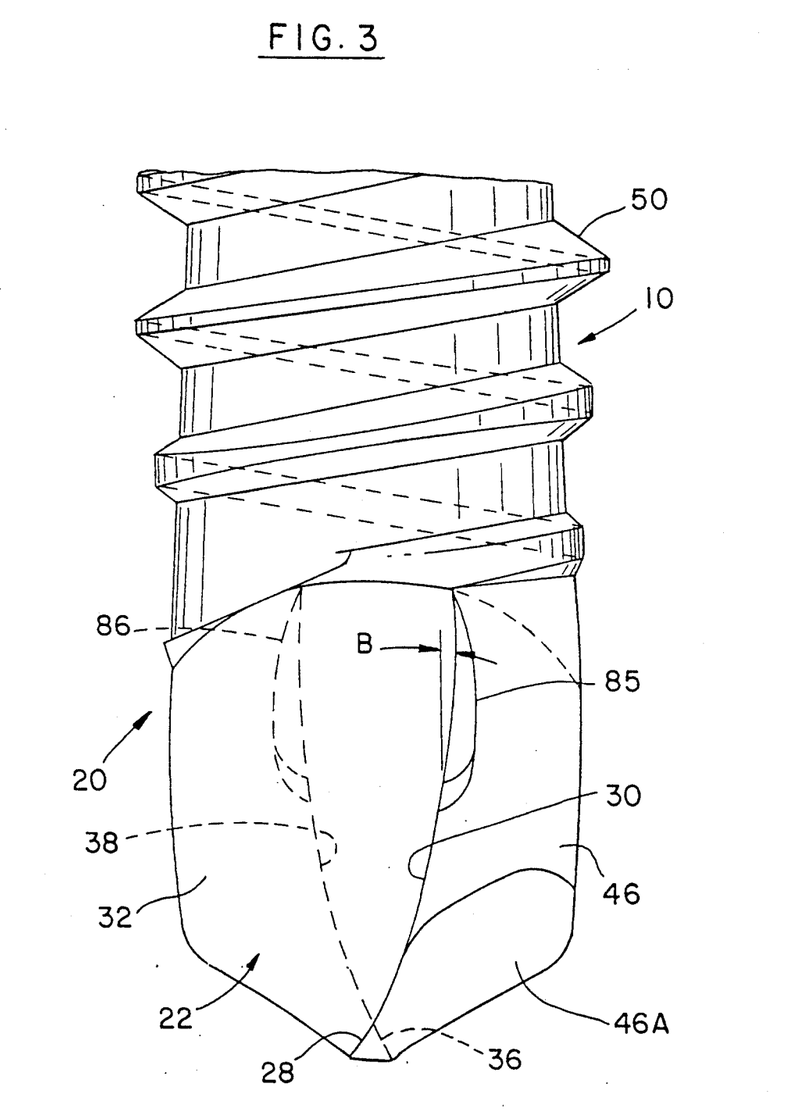
FIG. 3 is an enlarged view of the screw shown in FIG. 2 viewed from a 90° angle.

The flute surfaces 26 and 34 are slightly arcuate and lie generally in a plane which has a small amount of angularity with respect to the longitudinal axis of the screw, whereby to facilitate removal of material from the cutting edges during the cutting operation. The contour of the flute surfaces 26 and 34, as best seen in FIGS. 3 and 4, provides the proper cutting angle and rake angle at the cutting edges 28, 81, 36, and 83. The drag surfaces 32 and 40 are also angularly disposed with respect to the longitudinal axis of the screw to facilitate discharge of material removed in the cutting operation.

As most clearly indicated in FIG. 4, the letter "a" depicts the maximum width of the cutting surfaces 28 and 36, which are greater than the maximum width of the drag surfaces 32 and 40, depicted by the letter "b". The flute surfaces 26, 34 lie generally offset from, and parallel to, the transverse major axis (a) of the elliptical pilot end, whereby essentially to define the major axis. The drag surfaces lie in a similar relation to the transverse axis (b). The letter "c" depicts the width of the major axis plus wing cutting edges 81 and 83. This width must be large enough so that the hole bored out by the wings has enough clearance for threads 50.

Accordingly, the initial pilot hole cut by the cooperative action of the cutting edges 28, 30, and 36,38 of the flute surfaces 26 and 34, respectively, in both the top workpiece (wood or equivalent material), and the bottom workpiece (steel or equivalent material), will be of greater diameter than the minor axis (b) of the pilot end. Thus, the drag surfaces 32 and 40, which may be considered to define the minor axis (b), will not engage the sidewalls of a pilot hole cut by the cutting edges.

Similarly, the arcuate portions of the drill point body intermediate the cutting and drag surfaces, hereinafter referred to as lands 46 and 48, will also not engage the sidewalls of a pilot hole. That is, the lands 46 and 48 progress transversely in generally arcuate contour from a minimum radius at the drag surfaces to a maximum radius at the cutting surface. A difference of approximately 10% in the length of the major and minor axes has been found adequate to ensure clearance by the lands 46 and 48, and, accordingly, is preferred.

In a like manner, the second pilot hole cut by the cooperative action of the knife-like cutting edges 81 and 83 of the wings attached to flute surfaces 26 and 34, respectively will be of greater diameter than axis (a) of the pilot end as well as of greater diameter than the major diameter of the helical thread convolutions 50 in the top workpiece. When cutting edges 81 and 83 of the wings, respectively, contact the bottom workpiece, a torque differential will be created greater than the strength of the wings defined by 81, 82, 85 and 83, 84, 86 causing their fracture from flute surfaces 26 and 34, respectively, thereby not altering the diameter of the initial pilot hole cut by 28, 30, and 36, 38 in the bottom workpiece.

Wings 87 and 88 have an improved configuration which results in improved drill times over other wing designs. When viewed as shown in FIG. 2, wings 87 and 88 appear to have a generally triangular shape. Of critical importance, cutting edge 81 is not perpendicular to the axis of rotation of the fastener 10, but rather is positioned at an angle to a plane perpendicular to the longitudinal axis of rotation located at the point where the cutting edge 81 meets the flute surface 26. This angle is referred to as the positive cutting edge relief angle. It is preferred that the positive cutting edge relief angle be within the range of 10° to 50°, with the range of about 20° to 40° being particularly preferred. The outer edge of the wing tapers back from said axis diameter (c) at an angle determined by the forging process and material flow, until it comes to a point at which it either meets the screw body, or in an alternate embodiment reaches the predetermined wing dimension designed into the forming die, at which point it will follow said predetermined dimension at an angle parallel to the wing cutting edges 81 and 83 back to the main pilot body. As best illustrated in FIG. 2, the trailing edges 82 and 84 are tapered toward the trailing end of the screw. That is, the transverse major axis across the wing diameter (c) decreased in length in the direction of the trailing end. This also facilitates the escape of material removed during the cutting operation, and decreases the effective cutting contact area whereby to minimize frictional drag through the top workpiece. This angle is referred to as the trailing end angle. It is preferred that the trailing end angle be within the range of about 5° to about 35°, with the range of about 10° to about 25° being particularly preferred.

Referring to FIG. 3, the thickness of the wing is shown to have a teardrop-like crescent shape that also contributes to the improved drill time. Important to the improved drill time is that leading surfaces 26A and 34A, which are extensions of the concave flute surfaces 26 and 34 defined by point of location 30A, wing trailing edge 82, wing cutting edge 81, and its point of intersection with secondary cutting edge 30, and point of location 38A, wing trailing edge 84, wing cutting edge 83 and its point of intersection with secondary cutting edge 38, respectively, are not parallel to a plane going through the longitudinal axis of rotation. Rather, leading surface 26A and 34A are positioned at an angle to such plane, which angle is referred to as a positive angle of attack. The preferred positive angle of attack B is from about one to five degrees, with from about 3 to 5 degrees being particularly preferred. In addition, the teardrop like crescent shape allows cutting edges 81 and 83 to have a knife-like shaped point. The thickness T of the wing must be sufficient so as not to fracture when cutting through the wood workpiece, but not so thick as to prevent fracturing of the wings when the metal workpiece is encountered. The preferred thickness T range is about 0.010 inch to 0.020 inch, with 0.010 inch to 0.015 inch being particularly preferred.

Figure 8A:
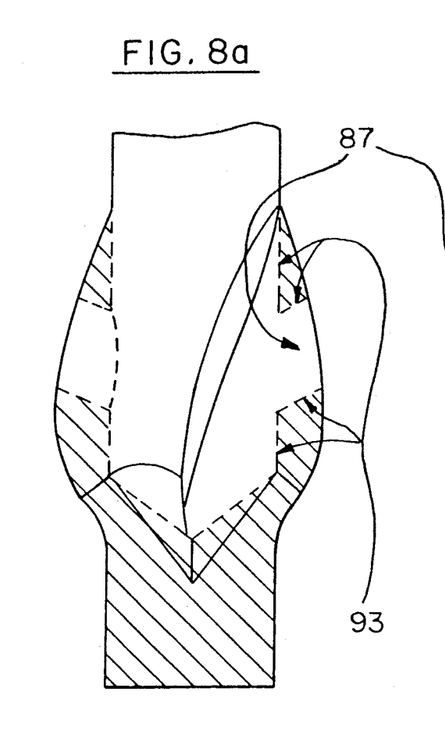
FIG. 8a is a side view of a forged pointed blank having a symmetrical wings.
Figure 8B:
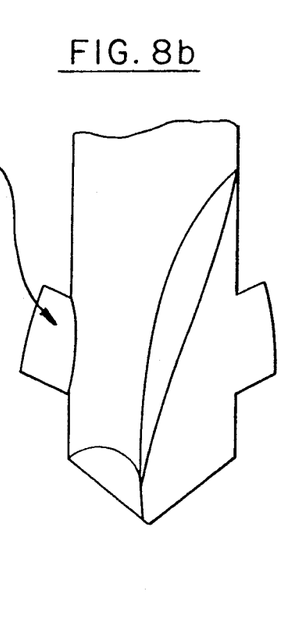
FIG. 8b is a view similar to that of FIG. 8a showing the rolled screw.
Figure 8C:
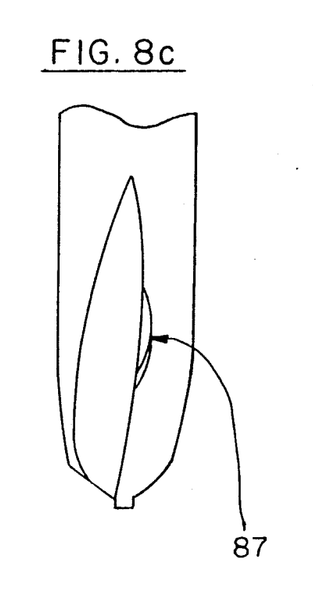
FIG. 8c is a side view of the screw shown in FIG. 8b.

The wings 87 and 88 are formed at a predetermined point along the concave arc of the flute surface 26 and 34 and protrude radially out from the screw axis to a predetermined diameter (c) greater than the axis of the major point body diameter (a). The inner concave surface of the wing is on a concave plane equal to, and even with, the concave plane of the flute surface 26 and 34 in the pilot end 20. Referring to FIGS. 2 and 8, the wings may be positioned along the edge of flute surface 22 at various distances from cutting edge 28. In general, it is positioned far enough away from cutting edge 28 so that the point can drill through the metal workpiece before the wings contact the hole. It is an important feature of the present invention that the wings may be positioned at various distances from the drill point. This provides flexibility to design wings which are superior for various situations. The methodology for varying the position of the wing along flute surfaces 26 and 34 will be described in greater detail hereinafter.

Referring to FIGS. 10 through 13, a greater strength can be imparted to the wing by the addition of ribs R which may be positioned at an angle such as the positive cutting edge relief angle; for example, so that the rib would be parallel to the cutting edge, or which may be perpendicular to the axis of rotation. Cross-sectional design of the support rib can also vary, although angular (FIGS. 10 and 11) or radial (FIGS. 12 and 13) are best suited to ease of manufacture.

An advantage of the support rib is particularly evident in small diameter fasteners that will be used in hard/tough wood applications. A standard drill screw heat treat is about 0.007 in case depth, doubled for front and back surface of the wing would equal 0.014 deep. A typical wing thickness of 0.020 would represent a wing 70% cased through, thereby being very brittle with a tendency to promote premature fracture in the hard or tough wood application. If the entire wing thickness were increased to lower the percent of case depth, the size of the wings thus produced would add enough total strength to the wing to hinder fracturing in the steel workpiece. In addition, the amount of material needed to fill out this thicker wing would have to be taken from the material needed to fill out the diameter across wings, thereby causing a possible undersized wing diameter. The support rib allows for specific placement of a minimum amount of material in specified area to strengthen and support the wing, in much the same manner that a truss adds strength and support while not hindering performance. The support rib would prohibit a 70% cased through condition with an identical 0.007 case depth heat treat. The core of material bounded by the outer surfaces of the rib and wing would remain ductile, and thereby resist premature fracture while not increasing strength enough to hinder designed fracture.

Helical thread convolutions 50 are formed on the trailing portion of the shank 12. The major axis (a) of the generally elliptical pilot end 20 defined by cutting edges 28, 30 and 36, 38 is of greater length than the root diameter of the threads of the shank 12 and the major axis (c) of the wings defined by cutting edges 81, 82 and 83, 84 is of greater length than the major diameter of the threads on the shank 12; see particularly FIG. 2 and FIG. 4. Thus, the pilot end defined by cutting edges 28, 30 and 36, 38 will cut a pilot hole of greater diameter than the root diameter of the shank 12 and the pilot end defined by cutting edge 81, trailing edge 82, and cutting edge 83, trailing edge 84 will cut a second pilot hole in the top workpiece only of greater diameter than the major diameter of the shank 12.

The fracture lines 93 and 94 are formed by the intersection of material in the forging operation of the teardrop shaped wing surfaces 85 and 86 and the drill point body lands 46 and 48, respectively. The origin of these fracture lines 93 and 94 can be evidenced in FIG. 6 as elements 93A and 94A which are created along with surfaces 92 and 98 on dies 71 and 72.

Figure 7A:
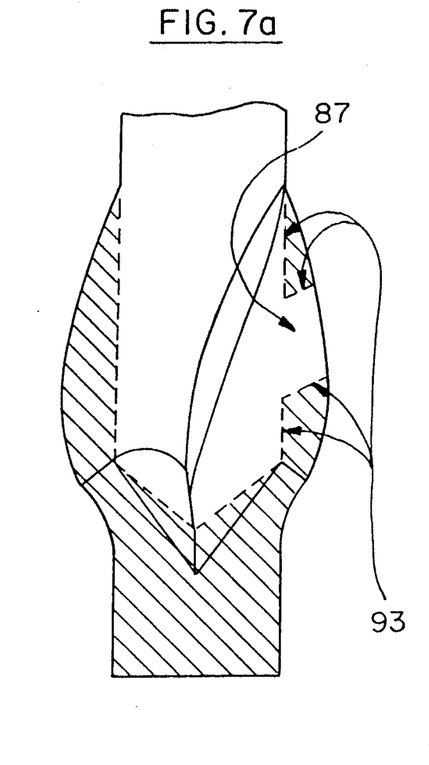
FIG. 7a is a side view of a forged pointed blank having a single wing.
Figure 7B:
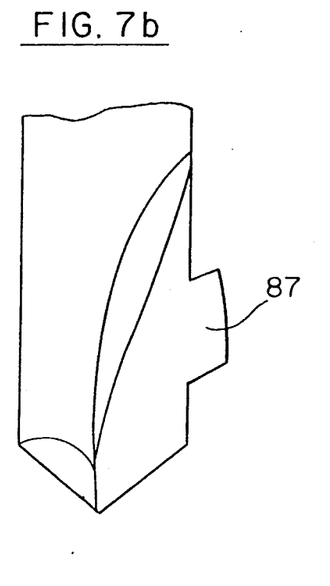
FIG. 7b is a view similar to that of FIG. 7a showing the rolled screw.
Figure 7C:
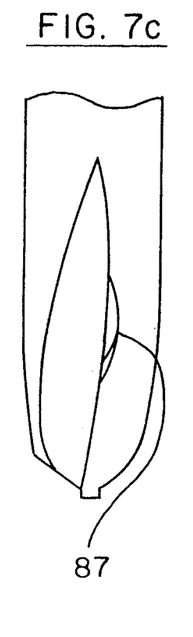
FIG. 7c is a side view taken from the right of the screw shown in FIG. 7b.
Figure 9A:
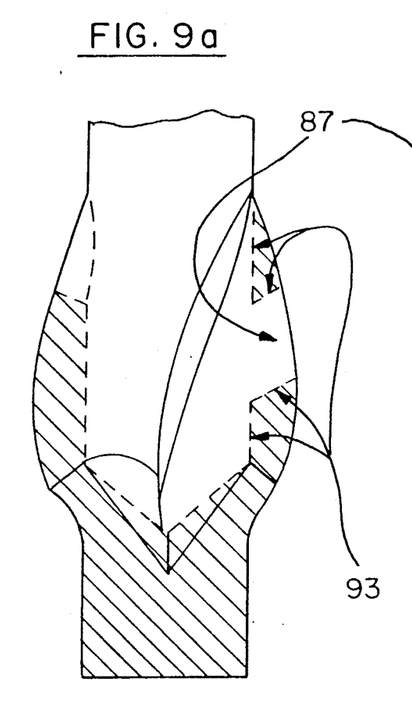
FIG. 9a is a side view of a forged pointed blank having symmetrical wings.
Figure 9B:
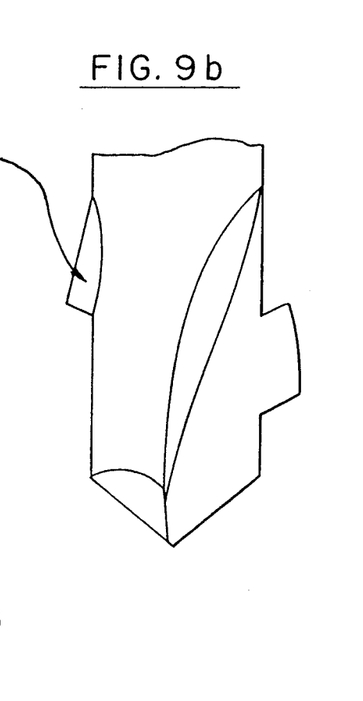
FIG. 9b is a view similar to that of FIG. 9a showing the rolled screw.
Figure 9C:
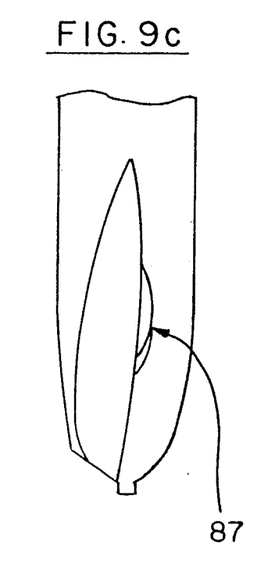
FIG. 9c is a side view of the screw shown in FIG. 9b.
Figures 10A, 10B:
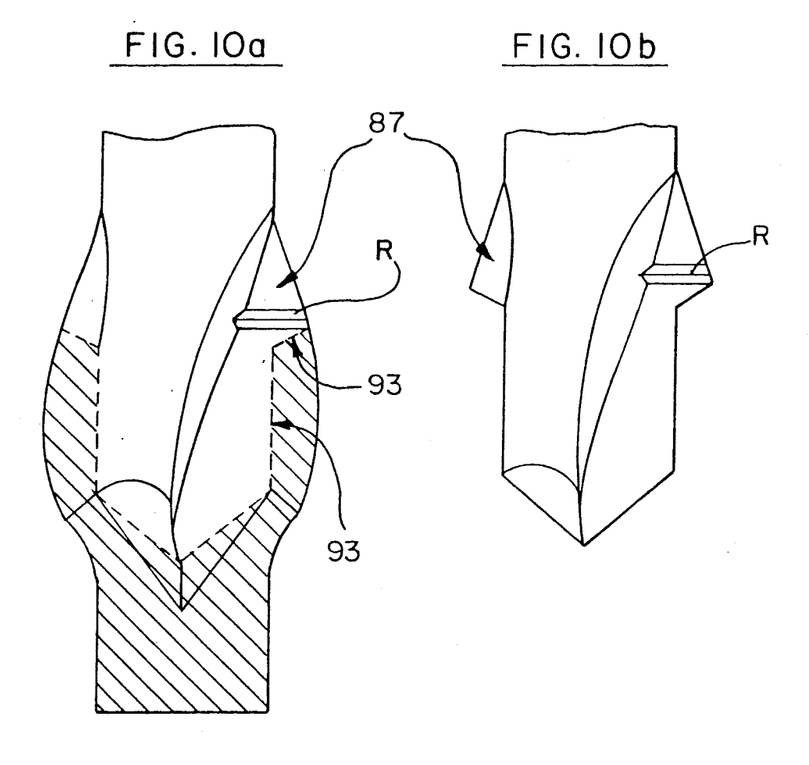
FIG. 10a is a side view of a forged pointed blank having symmetrical wings with horizontal angular support ribs.
FIG. 10b is a view similar to that of FIG. 10a showing the rolled screw.
Figure 10C:
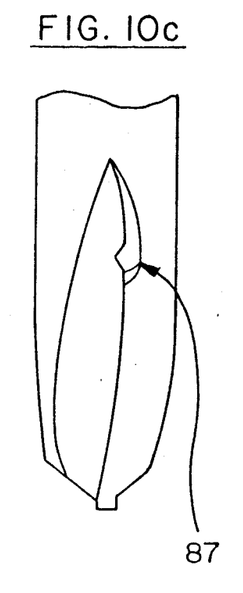
FIG. 10c is a side view of the screw shown in FIG. 10b.
Figures 11A, 11B:
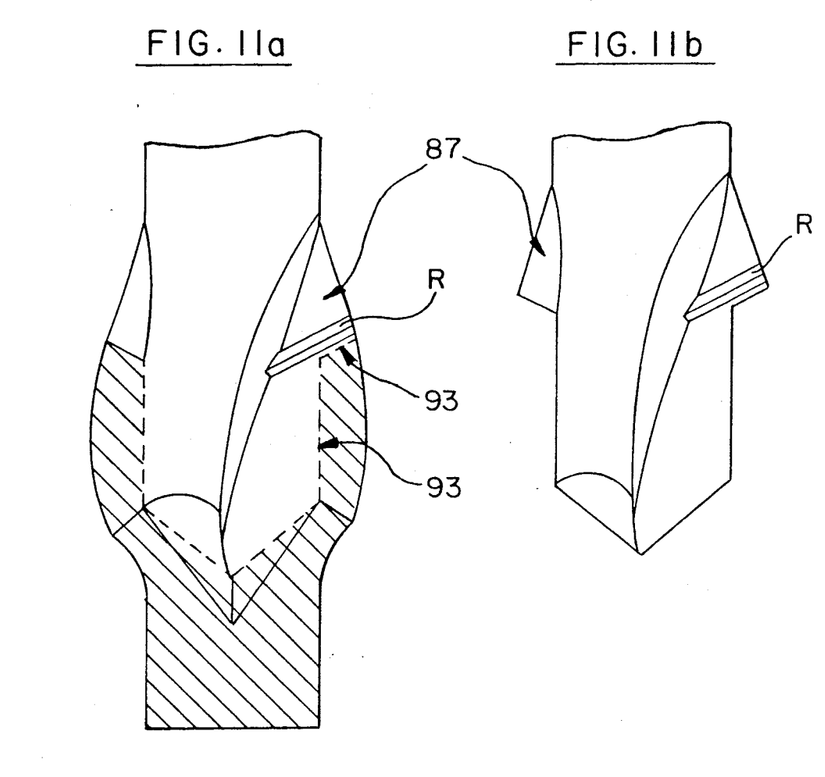
FIG. 11a is a side view of a forged pointed blank having symmetrical wings with angular support ribs parallel to the cutting edge of the wings.
FIG. 11b is a view similar to that of FIG. 11a showing the rolled screw.
Figure 11C:
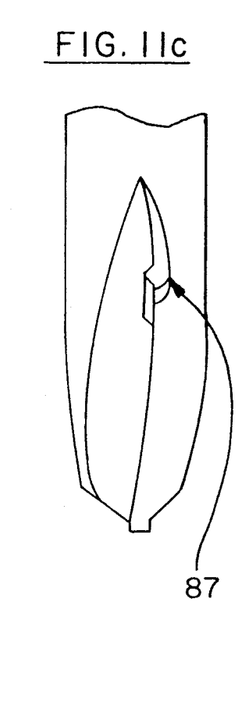
FIG. 11c is a side view of the screw shown in FIG. 11b.
Figure 12A:
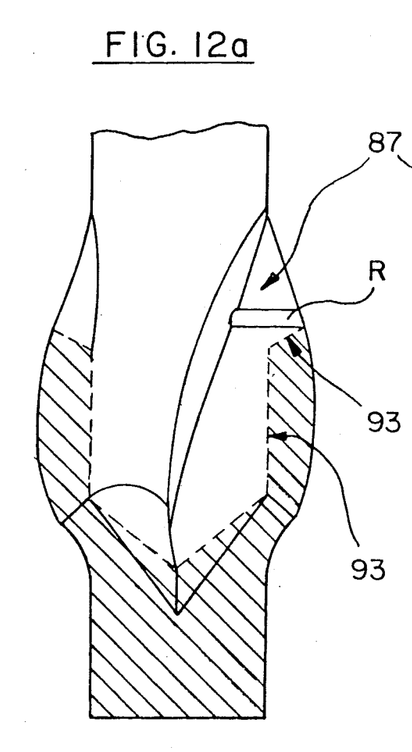
FIG. 12a is a side view of a forged pointed blank having symmetrical wings with horizontal radial support ribs.
Figure 12B:
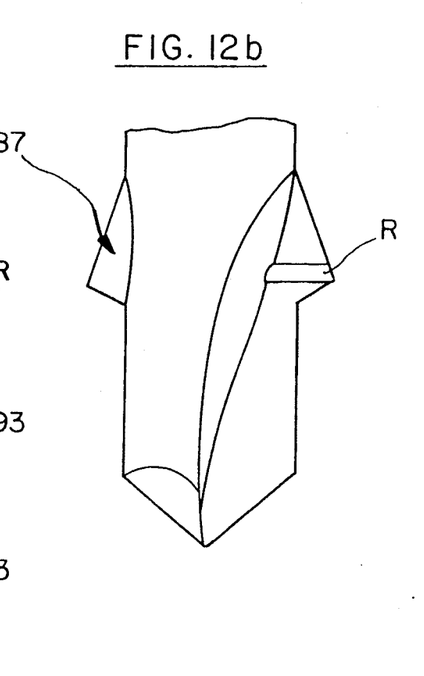
FIG. 12b is a view similar to that of FIG. 12a showing the rolled screw.
Figure 12C:
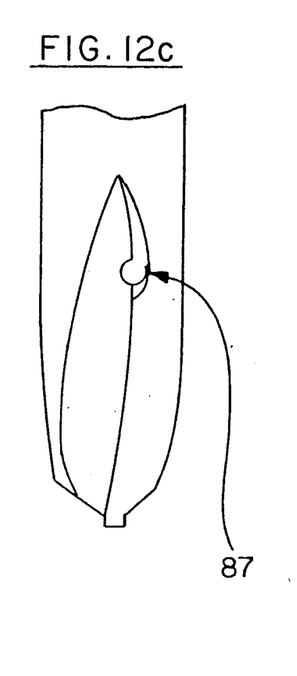
FIG. 12c is a side view of the screw shown in FIG. 12b.
Figures 13A, 13B:
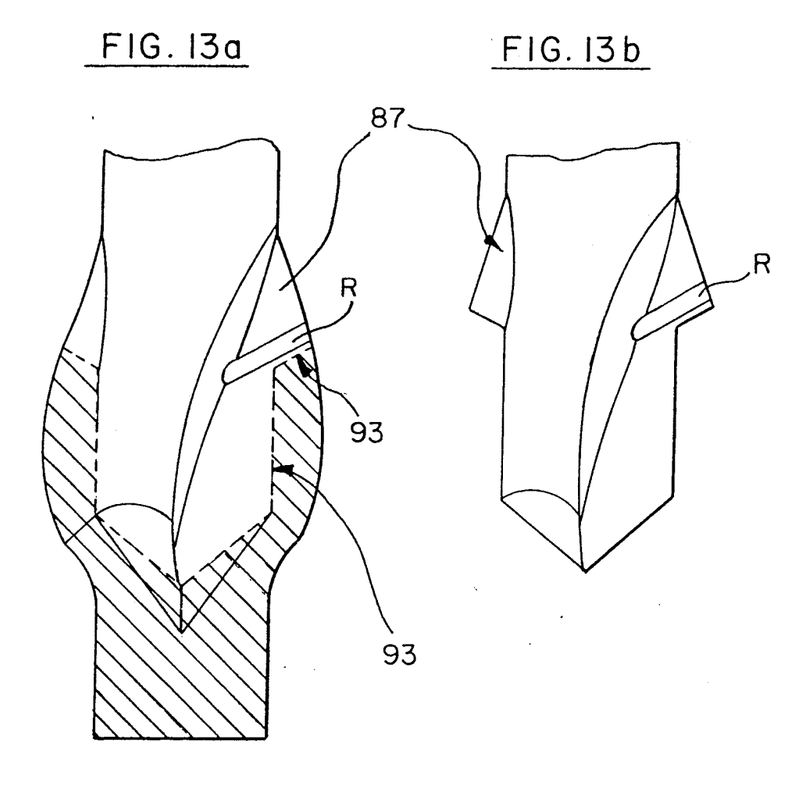
FIG. 13a is a side view of a forged pointed blank having symmetrical wings with radial support ribs parallel to the cutting edge of the wings.
FIG. 13b is a view similar to that of FIG. 13a showing the rolled screw.
Figure 13C:
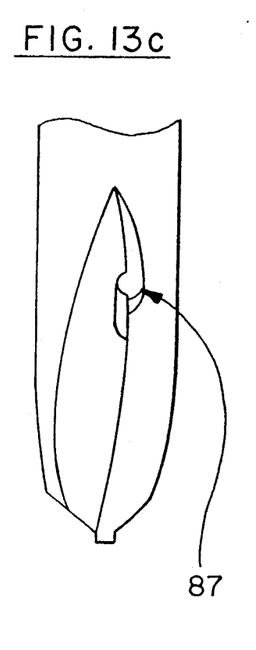
FIG. 13c is a side view of the screw shown in FIG. 13b.

Referring to FIGS. 9, the wings may be positioned in an asymmetrical fashion. It may also be desirable to provide only one wing instead of two as depicted in FIG. 7. These and other equivalent designs are contemplated as part of the invention.

In order to illustrate the improved drill times exhibited by the wings having the configuration according to the present invention, the following test was conducted. A comparison drill test was conducted using a standard drill testing apparatus as described in IFI-113 and SAE-J78. Ten samples each of three wing designs were drilled through ⅞" thick seasoned white oak, at 2500 RPM with a 15 pound load. In the following test, Design Number 1 was a 4 plus point screw with a wing design according to the present invention with symmetrical wings having an angle of attack of 2° and a cutting edge relief angle of 20°. Design Number 2 was a 4 plus point screw with a wing design according to the present invention but having an asymmetrical wing placement (as in FIG. 9) but with the same angle of attack and cutting edge relief angle as in the first design. Design Number 3 was a 12×2½ Shinjo reamer which is a commercial version of the screws described in U.S. Pat. No. 4,722,107.

The results of the test were as follows:

| | DRILL TIME IN SECONDS | |
| --- | --- | --- |
| DESIGN NO. 1 | DESIGN NO. 2 | DESIGN NO. 3 |
| 6.38 | 3.83 | 6.30 |
| 2.29 | 5.09 | 4.62 |
| 2.14 | 2.58 | 8.47 |
| 2.31 | 4.23 | 6.39 |
| 4.71  X̄ = 4.48 | 3.44  X̄ = 3.38 | 2.94  X̄ = 5.67 |
| 2.38 | 6.30 | 5.45 |
| 5.71 | 3.16 | 3.27 |
| 6.05 | 3.82 | 7.06 |
| 8.88 | 3.60 | 5.16 |
| 3.96 | 2.27 | 7.06 |

As can be seen by the test results, both Design Number 1 and Design Number 2, according to the present invention, exhibited drill times substantially faster than that of Design Number 3, the prior art screw.

Referring now to FIG. 6, there is shown a pair of mating dies 71 and 72, to produce the fastener shown in FIGS. 1 through 5. The dies 71 and 72 are similar to that shown in U.S. Pat. No. 3,395,603, but incorporate the improvement providing a fastener described with references to FIGS. 1 through 5 and FIGS. 8 through 13. The dies 71 and 72 are comprised of convex portion 95 and 96 referred to as saddles, disposed for forming the flute surfaces 26 and 34, on a workpiece and related surfaces for forming the drill point section 20 of the fastener in a forging process, which is well known in the art.

In order to accomplish the objective of the present invention, the concave surfaces 97 and 98 are provided with more acutely concave surfaces 91 and 92, also referred to as channels. In this way, during the forging operation as dies 71 and 72 come together and concave surfaces 97 and 98 mate with saddles 96 and 95, respectfully, the channels 91 and 92 create a void between said surfaces forming the escape route for the metal to naturally flow and produce wings 87 and 88.

By adjusting the location or position of the channels 91 and 92 on concave surfaces 98 and 97 during fabrication or alteration of the dies 71 and 72, alternate embodiments of the invention, as shown in FIGS. 7 through 9, may be achieved.

In addition, by further fabrication or alteration of dies 71 and 72, namely providing the saddles 95 and 96 with their own channels of specified cross-section and location, the support rib R, as depicted in the alternate embodiments of FIGS. 10 through 13, will be produced during the same forging operation as drill point section 20, including wings 87 and 88.

We claim:

1. A drilling and thread forming fastener for fastening a softer workpiece to a harder workpiece comprising
   a threaded shank and
   a pilot end,
   a plurality of flutes extending longitudinally along said pilot end, each defining a flute surface and a drag surface,
   at least one material removing wing extending radially outwardly from and frangibly connected to said pilot end, said wing having
   a leading surface defining an angle of between about 1 and 5 degrees to the longitudinal axis of said fastener, said leading surface being continuous with a portion of an associated flute surface,
   a trailing convex surface which merges into said pilot end and which with said leading surface defines a tear-drop like crescent shaped rib when said wing is viewed radially,
   said surfaces terminating at a lower cutting edge making a relief angle of about 10 to 50 degrees to a plane perpendicular to said longitudinal axis and
   said rib tapering radially inwardly from the outermost end of said cutting edge to the location where it mergers into said pilot portion.

2. The drilling and thread forming fastener according to claim 1 wherein there are two wings.

3. The drilling and thread forming fastener of claim 1 when the outer diameter of each of said wings is greater than the diameter of the threads of said threaded shank.

4. The drilling and thread forming fastener of claim 3 wherein said rib is parallel to the cutting edge of said wing.

5. The drilling and thread forming fastener of claim 3 wherein said rib is perpendicular to the longitudinal axis of rotation of said fastener.

6. The drilling and thread forming fastener of claim 1 wherein said wings are located so that the trailing angle of said wings terminates at the uppermost point of the pilot end away from the pointed tip at the position where the flute surface and the flute wall intersect and terminate.

7. The drilling and thread forming fastener of claim 1 wherein said wings are located at a predetermined point between the uppermost portion of said flute and the intersection of the primary and secondary cutting edges.

* * * * *